(12) United States Patent
Langhammer

(10) Patent No.: US 8,255,448 B1
(45) Date of Patent: Aug. 28, 2012

(54) IMPLEMENTING DIVISION IN A PROGRAMMABLE INTEGRATED CIRCUIT DEVICE

(75) Inventor: Martin Langhammer, Alderbury (GB)

(73) Assignee: Altera Corporation, San Jose, CA (US)

( * ) Notice: Subject to any disclaimer, the term of this patent is extended or adjusted under 35 U.S.C. 154(b) by 1000 days.

(21) Appl. No.: 12/244,565

(22) Filed: Oct. 2, 2008

(51) Int. Cl.
G06F 7/52 (2006.01)
(52) U.S. Cl. ........................................ 708/653; 708/232
(58) Field of Classification Search .................. 708/250, 708/253, 254, 650, 653, 654, 230, 232
See application file for complete search history.

(56) References Cited

U.S. PATENT DOCUMENTS

| | | | |
|---|---|---|---|
| 3,473,160 A | 10/1969 | Wahlstrom | |
| 4,156,927 A | 5/1979 | McElroy et al. | |
| 4,179,746 A | 12/1979 | Tubbs | |
| 4,212,076 A | 7/1980 | Conners | |
| 4,215,406 A | 7/1980 | Gomola et al. | |
| 4,215,407 A | 7/1980 | Gomola et al. | |
| 4,422,155 A | 12/1983 | Amir et al. | |
| 4,484,259 A | 11/1984 | Palmer et al. | |
| 4,521,907 A | 6/1985 | Amir et al. | |
| 4,597,053 A | 6/1986 | Chamberlin | |
| 4,623,961 A | 11/1986 | Mackiewicz | |
| 4,682,302 A | 7/1987 | Williams | |
| 4,718,057 A | 1/1988 | Venkitakrishnan et al. | |
| 4,727,508 A | 2/1988 | Williams | |
| 4,791,590 A | 12/1988 | Ku et al. | |
| 4,799,004 A | 1/1989 | Mori | |
| 4,823,295 A | 4/1989 | Mader | |
| 4,839,847 A | 6/1989 | Laprade | |
| 4,871,930 A | 10/1989 | Wong et al. | |
| 4,912,345 A | 3/1990 | Steele et al. | |
| 4,967,160 A | 10/1990 | Quievy et al. | |
| 4,982,354 A | 1/1991 | Takeuchi et al. | |
| 4,994,997 A | 2/1991 | Martin et al. | |
| 5,046,038 A * | 9/1991 | Briggs et al. | .................. 708/654 |
| 5,122,685 A | 6/1992 | Chan et al. | |
| 5,128,559 A | 7/1992 | Steele | |
| 5,175,702 A | 12/1992 | Beraud et al. | |
| 5,208,491 A | 5/1993 | Ebeling et al. | |

(Continued)

FOREIGN PATENT DOCUMENTS

EP        0 158 430        10/1985

(Continued)

OTHER PUBLICATIONS

Amos, D., "PLD architectures match DSP algorithms," *Electronic Product Design*, vol. 17, No. 7, Jul. 1996, pp. 30, 32.

(Continued)

*Primary Examiner* — Chuong D Ngo
(74) *Attorney, Agent, or Firm* — Ropes & Gray LLP; Jeffrey H. Ingerman

(57) ABSTRACT

Division can be performed in a programmable integrated circuit device by computing a relatively small number of bits of the inverse of the divisor, and then programming multipliers in a specialized processing block of the device to perform multiplication of the dividend and the inverted divisor. The specialized processing block is constructed to be able to be programmed to support such asymmetric multiplication by providing programmable shifting of partial products, so that the partial products can be shifted one number of bits for symmetric multiplication and a different number of bits for asymmetric multiplication. The process is performed recursively, by chaining a plurality of the specialized processing blocks, so that the result converges notwithstanding the relatively low precision of the inverted divisor.

50 Claims, 6 Drawing Sheets

U.S. PATENT DOCUMENTS

| | | |
|---|---|---|
| RE34,363 E | 8/1993 | Freeman |
| 5,267,187 A | 11/1993 | Hsieh et al. |
| 5,296,759 A | 3/1994 | Sutherland et al. |
| 5,338,983 A | 8/1994 | Agarwala |
| 5,349,250 A | 9/1994 | New |
| 5,357,152 A | 10/1994 | Jennings, III et al. |
| 5,371,422 A | 12/1994 | Patel et al. |
| 5,381,357 A | 1/1995 | Wedgwood et al. |
| 5,404,324 A | 4/1995 | Colon-Bonet |
| 5,424,589 A | 6/1995 | Dobbelaere et al. |
| 5,446,651 A | 8/1995 | Moyse et al. |
| 5,451,948 A | 9/1995 | Jekel |
| 5,452,231 A | 9/1995 | Butts et al. |
| 5,452,375 A | 9/1995 | Rousseau et al. |
| 5,457,644 A | 10/1995 | McCollum |
| 5,465,226 A | 11/1995 | Goto |
| 5,465,375 A | 11/1995 | Thepaut et al. |
| 5,483,178 A | 1/1996 | Costello et al. |
| 5,497,498 A | 3/1996 | Taylor |
| 5,500,828 A | 3/1996 | Doddington et al. |
| 5,523,963 A | 6/1996 | Hsieh et al. |
| 5,528,550 A | 6/1996 | Pawate et al. |
| 5,537,601 A | 7/1996 | Kimura et al. |
| 5,546,018 A | 8/1996 | New et al. |
| 5,550,993 A | 8/1996 | Ehlig et al. |
| 5,559,450 A | 9/1996 | Ngai et al. |
| 5,563,526 A | 10/1996 | Hastings et al. |
| 5,563,819 A | 10/1996 | Nelson |
| 5,570,039 A | 10/1996 | Oswald et al. |
| 5,570,040 A | 10/1996 | Lytle et al. |
| 5,572,148 A | 11/1996 | Lytle et al. |
| 5,581,501 A | 12/1996 | Sansbury et al. |
| 5,590,350 A | 12/1996 | Guttag et al. |
| 5,594,366 A | 1/1997 | Khong et al. |
| 5,594,912 A | 1/1997 | Brueckmann et al. |
| 5,596,763 A | 1/1997 | Guttag et al. |
| 5,606,266 A | 2/1997 | Pedersen |
| 5,617,058 A | 4/1997 | Adrian et al. |
| 5,633,601 A | 5/1997 | Nagaraj |
| 5,636,150 A | 6/1997 | Okamoto |
| 5,636,368 A | 6/1997 | Harrison et al. |
| 5,640,578 A | 6/1997 | Balmer et al. |
| 5,644,522 A | 7/1997 | Moyse et al. |
| 5,646,545 A | 7/1997 | Trimberger et al. |
| 5,648,732 A | 7/1997 | Duncan |
| 5,652,903 A | 7/1997 | Weng et al. |
| 5,655,069 A | 8/1997 | Ogawara et al. |
| 5,664,192 A | 9/1997 | Lloyd et al. |
| 5,689,195 A | 11/1997 | Cliff et al. |
| 5,696,708 A | 12/1997 | Leung |
| 5,729,495 A | 3/1998 | Madurawe |
| 5,740,404 A | 4/1998 | Baji |
| 5,744,980 A | 4/1998 | McGowan et al. |
| 5,744,991 A | 4/1998 | Jefferson et al. |
| 5,754,459 A | 5/1998 | Telikepalli |
| 5,761,483 A | 6/1998 | Trimberger |
| 5,764,555 A | 6/1998 | McPherson et al. |
| 5,768,613 A | 6/1998 | Asghar |
| 5,777,912 A | 7/1998 | Leung et al. |
| 5,784,636 A | 7/1998 | Rupp |
| 5,790,446 A | 8/1998 | Yu et al. |
| 5,794,067 A | 8/1998 | Kadowaki |
| 5,801,546 A | 9/1998 | Pierce et al. |
| 5,805,477 A | 9/1998 | Perner |
| 5,805,913 A | 9/1998 | Guttag et al. |
| 5,812,479 A | 9/1998 | Cliff et al. |
| 5,812,562 A | 9/1998 | Baeg |
| 5,815,422 A | 9/1998 | Dockser |
| 5,821,776 A | 10/1998 | McGowan |
| 5,825,202 A | 10/1998 | Tavana et al. |
| 5,838,165 A | 11/1998 | Chatter |
| 5,841,684 A | 11/1998 | Dockser |
| 5,847,579 A | 12/1998 | Trimberger |
| 5,859,878 A | 1/1999 | Phillips et al. |
| 5,869,979 A | 2/1999 | Bocchino |
| 5,872,380 A | 2/1999 | Rostoker et al. |
| 5,874,834 A | 2/1999 | New |
| 5,878,250 A | 3/1999 | LeBlanc |
| 5,880,981 A | 3/1999 | Kojima et al. |
| 5,892,962 A | 4/1999 | Cloutier |
| 5,894,228 A | 4/1999 | Reddy et al. |
| 5,898,602 A | 4/1999 | Rothman et al. |
| 5,931,898 A | 8/1999 | Khoury |
| 5,942,914 A | 8/1999 | Reddy et al. |
| 5,944,774 A | 8/1999 | Dent |
| 5,949,710 A | 9/1999 | Pass et al. |
| 5,951,673 A | 9/1999 | Miyata |
| 5,956,265 A | 9/1999 | Lewis |
| 5,959,871 A | 9/1999 | Pierzchala et al. |
| 5,960,193 A | 9/1999 | Guttag et al. |
| 5,961,635 A | 10/1999 | Guttag et al. |
| 5,963,048 A | 10/1999 | Harrison et al. |
| 5,963,050 A | 10/1999 | Young et al. |
| 5,968,196 A | 10/1999 | Ramamurthy et al. |
| 5,970,254 A | 10/1999 | Cooke et al. |
| 5,978,260 A | 11/1999 | Trimberger et al. |
| 5,982,195 A | 11/1999 | Cliff et al. |
| 5,986,465 A | 11/1999 | Mendel |
| 5,991,788 A | 11/1999 | Mintzer |
| 5,991,898 A | 11/1999 | Rajski et al. |
| 5,995,748 A | 11/1999 | Guttag et al. |
| 5,999,015 A | 12/1999 | Cliff et al. |
| 5,999,990 A | 12/1999 | Sharrit et al. |
| 6,005,806 A | 12/1999 | Madurawe et al. |
| 6,006,321 A | 12/1999 | Abbott |
| 6,009,451 A | 12/1999 | Burns |
| 6,020,759 A | 2/2000 | Heile |
| 6,021,423 A | 2/2000 | Nag et al. |
| 6,029,187 A | 2/2000 | Verbauwhede |
| 6,031,763 A | 2/2000 | Sansbury |
| 6,041,340 A | 3/2000 | Mintzer |
| 6,052,327 A | 4/2000 | Reddy et al. |
| 6,052,755 A | 4/2000 | Terrill et al. |
| 6,064,614 A | 5/2000 | Khoury |
| 6,065,131 A | 5/2000 | Andrews et al. |
| 6,066,960 A | 5/2000 | Pedersen |
| 6,069,487 A | 5/2000 | Lane et al. |
| 6,072,994 A | 6/2000 | Phillips et al. |
| 6,073,154 A | 6/2000 | Dick |
| 6,075,381 A | 6/2000 | LaBerge |
| 6,084,429 A | 7/2000 | Trimberger |
| 6,085,317 A | 7/2000 | Smith |
| 6,091,261 A | 7/2000 | DeLange |
| 6,091,765 A | 7/2000 | Pietzold, III et al. |
| 6,094,726 A | 7/2000 | Gonion et al. |
| 6,097,988 A | 8/2000 | Tobias |
| 6,098,163 A | 8/2000 | Guttag et al. |
| 6,107,820 A | 8/2000 | Jefferson et al. |
| 6,107,821 A | 8/2000 | Kelem et al. |
| 6,107,824 A | 8/2000 | Reddy et al. |
| 6,130,554 A | 10/2000 | Kolze et al. |
| 6,140,839 A | 10/2000 | Kaviani et al. |
| 6,154,049 A | 11/2000 | New |
| 6,157,210 A | 12/2000 | Zaveri et al. |
| 6,163,788 A | 12/2000 | Chen et al. |
| 6,167,415 A | 12/2000 | Fischer et al. |
| 6,175,849 B1 | 1/2001 | Smith |
| 6,215,326 B1 | 4/2001 | Jefferson et al. |
| 6,226,735 B1 | 5/2001 | Mirsky |
| 6,242,947 B1 | 6/2001 | Trimberger |
| 6,243,729 B1 | 6/2001 | Staszewski |
| 6,246,258 B1 | 6/2001 | Lesea |
| 6,279,021 B1 | 8/2001 | Takano et al. |
| 6,286,024 B1 | 9/2001 | Yano et al. |
| 6,314,442 B1 | 11/2001 | Suzuki |
| 6,314,551 B1 | 11/2001 | Borland |
| 6,321,246 B1 | 11/2001 | Page et al. |
| 6,323,680 B1 | 11/2001 | Pedersen et al. |
| 6,351,142 B1 | 2/2002 | Abbott |
| 6,359,468 B1 | 3/2002 | Park et al. |
| 6,362,650 B1 | 3/2002 | New et al. |
| 6,366,944 B1 | 4/2002 | Hossain et al. |
| 6,367,003 B1 | 4/2002 | Davis |
| 6,407,576 B1 | 6/2002 | Ngai et al. |
| 6,407,694 B1 | 6/2002 | Cox et al. |
| 6,438,570 B1 | 8/2002 | Miller |
| 6,453,382 B1 | 9/2002 | Heile |

| | | | |
|---|---|---|---|
| 6,467,017 B1 | 10/2002 | Ngai et al. | |
| 6,480,980 B2 | 11/2002 | Koe | |
| 6,483,343 B1 | 11/2002 | Faith et al. | |
| 6,531,888 B2 | 3/2003 | Abbott | |
| 6,538,470 B1 | 3/2003 | Langhammer et al. | |
| 6,542,000 B1 | 4/2003 | Black et al. | |
| 6,556,044 B2 | 4/2003 | Langhammer et al. | |
| 6,557,092 B1 | 4/2003 | Callen | |
| 6,571,268 B1 | 5/2003 | Giacalone et al. | |
| 6,573,749 B2 | 6/2003 | New et al. | |
| 6,574,762 B1 | 6/2003 | Karimi et al. | |
| 6,591,283 B1 | 7/2003 | Conway et al. | |
| 6,591,357 B2 | 7/2003 | Mirsky | |
| 6,600,788 B1 | 7/2003 | Dick et al. | |
| 6,628,140 B2 | 9/2003 | Langhammer et al. | |
| 6,700,581 B2 | 3/2004 | Baldwin et al. | |
| 6,725,441 B1 | 4/2004 | Keller et al. | |
| 6,728,901 B1 | 4/2004 | Rajski et al. | |
| 6,731,133 B1 | 5/2004 | Feng et al. | |
| 6,732,135 B1 * | 5/2004 | Samudrala et al. | 708/654 |
| 6,744,278 B1 | 6/2004 | Liu et al. | |
| 6,745,254 B2 | 6/2004 | Boggs et al. | |
| 6,774,669 B1 | 8/2004 | Liu et al. | |
| 6,781,408 B1 | 8/2004 | Langhammer | |
| 6,781,410 B2 | 8/2004 | Pani et al. | |
| 6,788,104 B2 | 9/2004 | Singh et al. | |
| 6,836,839 B2 | 12/2004 | Master et al. | |
| 6,874,079 B2 | 3/2005 | Hogenauer | |
| 6,904,471 B2 | 6/2005 | Boggs et al. | |
| 6,924,663 B2 | 8/2005 | Masui et al. | |
| 6,971,083 B1 | 11/2005 | Farrugia et al. | |
| 2001/0029515 A1 | 10/2001 | Mirsky | |
| 2002/0089348 A1 | 7/2002 | Langhammer | |
| 2003/0088757 A1 | 5/2003 | Lindner et al. | |
| 2004/0064770 A1 | 4/2004 | Xin | |
| 2004/0083412 A1 | 4/2004 | Corbin et al. | |
| 2004/0178818 A1 | 9/2004 | Crotty et al. | |
| 2004/0193981 A1 | 9/2004 | Clark et al. | |
| 2005/0144215 A1 | 6/2005 | Simkins et al. | |
| 2005/0166038 A1 | 7/2005 | Wang et al. | |
| 2005/0187999 A1 | 8/2005 | Zheng et al. | |
| 2007/0185951 A1 | 8/2007 | Lee et al. | |
| 2007/0185952 A1 | 8/2007 | Langhammer et al. | |
| 2008/0133627 A1 | 6/2008 | Langhammer et al. | |

FOREIGN PATENT DOCUMENTS

| | | |
|---|---|---|
| EP | 0 380 456 | 8/1990 |
| EP | 0 411 491 | 2/1991 |
| EP | 0 461 798 | 12/1991 |
| EP | 0 498 066 | 8/1992 |
| EP | 0 555 092 | 8/1993 |
| EP | 0 606 653 | 7/1994 |
| EP | 0 657 803 | 6/1995 |
| EP | 0 660 227 | 6/1995 |
| EP | 0 668 659 | 8/1995 |
| EP | 0 905 906 | 3/1999 |
| EP | 0 909 028 | 4/1999 |
| EP | 0 927 393 | 7/1999 |
| EP | 0 992 885 | 4/2000 |
| EP | 1 031 934 | 8/2000 |
| EP | 1 058 185 | 12/2000 |
| EP | 1 220 108 | 7/2002 |
| GB | 2 283 602 | 5/1995 |
| GB | 2 286 737 | 8/1995 |
| GB | 2 318 198 | 4/1998 |
| JP | 61 237133 | 10/1986 |
| JP | 7-135447 | 5/1995 |
| WO | WO95/27243 | 10/1995 |
| WO | WO96/28774 | 9/1996 |
| WO | WO97/08606 | 3/1997 |
| WO | WO98/12629 | 3/1998 |
| WO | WO98/32071 | 7/1998 |
| WO | WO98/38741 | 9/1998 |
| WO | WO99/22292 | 5/1999 |
| WO | WO99/31574 | 6/1999 |
| WO | WO99/56394 | 11/1999 |
| WO | WO00/51239 | 8/2000 |
| WO | WO00/52824 | 9/2000 |
| WO | WO01/13562 | 2/2001 |
| WO | WO2005/101190 | 10/2005 |

OTHER PUBLICATIONS

Analog Devices, Inc., The Applications Engineering Staff of Analog Devices, DSP Division, *Digital Signal Processing Applications Using the ADSP-2100 Family* (edited by Amy Mar), 1990, pp. 141-192).

Andrejas, J., et al., "Reusable DSP functions in FPGAs," *Field-Programmable Logic and Applications. Roadmap to Reconfigurable Computing. 10th International Conference, FPL 2000. Proceedings (Lecture Notes in Computer Science* vol. 1896), Aug. 27-30, 2000, pp. 456-461.

Aoki, T., "Signed-weight arithmetic and its application to a field-programmable digital filter architecture," *IEICE Transactions on Electronics*, 1999, vol. E82C, No. 9, Sep. 1999, pp. 1687-1698.

Ashour, M.A., et al., "An FPGA implementation guide for some different types of serial-parallel multiplier-structures," *Microelectronics Journal*, vol. 31, No. 3, 2000, pp. 161-168.

Berg. B.L., et al."Designing Power and Area Efficient Multistage FIR Decimators with Economical Low Order Filters," *ChipCenter Technical Note*, Dec. 2001.

Bursky, D., "Programmable Logic Challenges Traditional ASIC SoC Designs", *Electronic Design*, Apr. 15, 2002.

Chhabra, A. et al., Texas Instruments Inc., "A Block Floating Point Implementation on the TMS320C54x DSP", Application Report SPRA610, Dec. 1999, pp. 1-10.

Colet, p., "When DSPs and FPGAs meet: Optimizing image processing architectures," *Advanced Imaging*, vol. 12, No. 9, Sep. 1997, pp. 14, 16, 18.

Crookes, D., et al., "Design and implementation of a high level programming environment for FPGA-based image processing," *IEE Proceedings-Vision, Image and Signal Processing*, vol. 147, No. 4, Aug. 2000, pp. 377-384.

Debowski, L., et al., "A new flexible architecture of digital control systems based on DSP and complex CPLD technology for power conversion applications," *PCIM 2000: Europe Official Proceedings of the Thirty-Seventh International Intelligent Motion Conference*, Jun. 6-8, 2000, pp. 281-286.

Dick, C., et al., "Configurable logic for digital communications: some signal processing perspectives," *IEEE Communications Magazine*, vol. 37, No. 8, Aug. 1999, pp. 107-111.

Do, T.-T., et al., "A flexible implementation of high-performance FIR filters on Xilinx FPGAs," *Field-Programmable Logic and Applications: From FPGAs to Computing Paradigm. 8th International Workshop, FPL '98. Proceedings*, Hartenstein, R.W., et al., eds., Aug. 31-Sep. 3, 1998, pp. 441-445.

Gaffer, A.A., et al., "Floating-Point Bitwidth Analysis via Automatic Differentiation," *IEEE Conference on Field Programmable Technology*, Hong Kong, Dec. 2002.

Guccione, S.A., "Run-time Reconfiguration at Xilinx," *Parallel and distributed processing: 15 IPDPS 2000 workshops*, Rolim, J., ed., May 1-5, 2000, p. 873.

Hauck, S., "The Future of Reconfigurable Systems," *Keynote Address, 5th Canadian Conference on Field Programmable Devices*, Jun. 1998, http://www.ee.washington.edu/people/faculty/hauck/publications/ReconfigFuture.PDF.

Heysters, P.M., et al., "Mapping of DSP algorithms on field programmable function arrays," *Field-Programmable Logic and Applications. Roadmap to Reconfigurable Computing. 10th International Conference, FPL 2000. Proceedings (Lecture Notes in Computer Science* vol. 1896), Aug. 27-30, 2000, pp. 400-411.

Huang, J., et al., "Simulated Performance of 1000BASE-T Receiver with Different Analog Front End Designs," *Proceedings of the 35th Asilomar Conference on Signals, Systems, and Computers*, Nov. 4-7, 2001.

Lattice Semiconductor Corp, *ORCA ® FPGA Express™Interface Manual: ispLEVER® Version 3.0*, 2002.

Lucent Technologies, Microelectronics Group,"Implementing and Optimizing Multipliers in ORCA™ FPGAs,", Application Note. AP97-008FGPA, Feb. 1997.

"Implementing Multipliers in FLEX 10K EABs", *Altera*, Mar. 1996.

"Implementing Logic with the Embedded Array in FLEX 10K Devices", Altera, May 2001, ver. 2.1.

Jinghua Li, "Design a pocket multi-bit multiplier in FPGA," *1996 2nd International Conference on ASIC Proceedings (IEEE Cat. No. 96TH8140)*, Oct. 21-24, 1996, pp. 275-279.

Jones, G., "Field-programmable digital signal conditioning," *Electronic Product Design*, vol. 21, No. 6, Jun. 2000, pp. C36-C38.

Kiefer, R., et al., "Performance comparison of software/FPGA hardware partitions for a DSP application," *14th Australian Microelectronics Conference. Microelectronics: Technology Today for the Future. MICRO '97 Proceedings*, Sep. 28-Oct. 1, 1997, pp. 88-93.

Kramberger, I., "DSP acceleration using a reconfigurable FPGA," *ISIE '99. Proceedings of the IEEE International Symposium on Industrial Electronics (Cat. No. 99TH8465)*, vol. 3 , Jul. 12-16, 1999, pp. 1522-1525.

Langhammer, M., "How to implement DSP in programmable logic," *Elettronica Oggi*, No. 266 , Dec. 1998, pp. 113-115.

Langhammer, M., "Implementing a DSP in Programmable Logic," *Online EE Times*, May 1998, http://www.eetimes.com/editorial/1998/coverstory9805.html.

Lazaravich, B.V., "Function block oriented field programmable logic arrays," *Motorola, Inc. Technical Developments*, vol. 18, Mar. 1993, pp. 10-11.

Lund, D., et al., "A new development system for reconfigurable digital signal processing," First International Conference on 3G Mobile Communication Technologies (Conf. Publ. No. 471), Mar. 27-29, 2000, pp. 306-310.

Miller, N.L., et al., "Reconfigurable integrated circuit for high performance computer arithmetic," *Proceedings of the 1998 IEE Colloquium on Evolvable Hardware Systems (Digest)*, No. 233, 1998, pp. 2/1-2/4.

Mintzer, L., "Xilinx FPGA as an FFT processor," *Electronic Engineering*, vol. 69, No. 845, May 1997, pp. 81, 82, 84.

Faura et al., "A Novel Mixed Signal Programmable Device With On-Chip Microprocessor," Custom Integrated Circuits Conference, 1997. Proceedings of the IEEE 1997 Santa Clara, CA, USA, May 5, 1997, pp. 103-106.

Nozal, L., et al., "A new vision system: programmable logic devices and digital signal processor architecture (PLD+DSP)," *Proceedings IECON '91. 1991 International Conference on Industrial Electronics, Control and Instrumentation (Cat. No. 91CH2976-9)*, vol. 3, Oct. 28-Nov. 1, 1991, pp. 2014-2018.

Papenfuss, J.R, et al., "Implementation of a real-time, frequency selective, RF channel simulator using a hybrid DSP-FPGA architecture," *RAWCON 2000: 2000 IEEE Radio and Wireless Conference (Cat. No. 00EX404)*, Sep. 10-13, 2000, pp. 135-138.

Parhami, B., "Configurable arithmetic arrays with data-driven control," *34th Asilomar Conference on Signals, Systems and Computers*, vol. 1, 2000, pp. 89-93.

"The QuickDSP Design Guide", Quicklogic, Aug. 2001, revision B.

"QuickDSP™ Family Data Sheet", *Quicklogic*, Aug. 7, 2001, revision B.

Rangasayee, K., "Complex PLDs let you produce efficient arithmetic designs," *EDN (European Edition)*, vol. 41, No. 13, Jun. 20, 1996, pp. 109, 110, 112, 114, 116.

Rosado, A., et al., "A high-speed multiplier coprocessor unit based on FPGA," *Journal of Electrical Engineering*, vol. 48, No. 11-12, 1997, pp. 298-302.

Santillan-Q., G.F., et al., "Real-time integer convolution implemented using systolic arrays and a digit-serial architecture in complex programmable logic devices," *Proceedings of the Third International Workshop on Design of Mixed-Mode Integrated Circuits and Applications (Cat. No. 99EX303)*, Jul. 26-28, 1999, pp. 147-150.

Texas Instruments Inc., "TMS320C54x DSP Reference Set, vol. 1: CPU and Peripherals", Literature No. SPRU131F, Apr. 1999, pp. 2-1 through 2-16 and 4-1 through 4-29.

Tisserand, A., et al., "An on-line arithmetic based FPGA for low power custom computing," *Field Programmable Logic and Applications, 9th International Workshop, FPL'99, Proceedings (Lecture Notes in Computer Science* vol. 1673), Lysaght, P., et al., eds., Aug. 30-Sep. 1, 1999, pp. 264-273.

Tralka, C., "Symbiosis of DSP and PLD," *Elektronik*, vol. 49, No. 14 , Jul. 11, 2000, pp. 84-96.

Valls, J., et al., "A Study About FPGA-Based Digital Filters," *Signal Processing Systems, 1998*, SIPS 98, 1998 IEEE Workshop, Oct. 10, 1998, pp. 192-201.

"Virtex-II 1.5V Field-Programmable Gate Arrays", *Xilinx*, Jan. 25, 2001, module 2 of 4.

"Virtex-II 1.5V Field-Programmable Gate Arrays", *Xilinx*, Apr. 2, 2001, module 1 of 4.

"Virtex-II 1.5V Field-Programmable Gate Arrays", *Xilinx*, Apr. 2, 2001, module 2 of 4.

Walters, A.L., "A Scaleable FIR Filter Implementation Using 32-bit Floating-Point Complex Arithmetic on ,a FPGA Based Custom Computing Platform," Allison L. Walters, Thesis Submitted to the Faculty of Virginia Polytechnic Institute and State University, Jan. 30, 1998.

Weisstein, E.W., "Karatsuba Multiplication " *MathWorld—A Wolfram Web Resource* (Dec. 9, 2007), accessed Dec. 11, 2007 at http://mathworld.wolfram.com/KaratsubaMultiplication.html.

Wenzel, L., "Field programmable gate arrays (FPGAs) to replace digital signal processor integrated circuits," *Elektronik*, vol. 49, No. 5, Mar. 7, 2000, pp. 78-86.

"Xilinx Unveils New FPGA Architecture to Enable High-Performance, 10 Million System Gate Designs", *Xilinx*, Jun. 22, 2000.

"Xilinx Announces DSP Algorithms, Tools and Features for Virtex-II Architecture", *Xilinx*, Nov. 21, 2000.

Xilinx Inc., "Virtex-II 1.5V Field-Programmable Gate Arrays", Advance Product Specification, DS031-2 (v1.9), Nov. 29, 2001, Module 2 of 4, pp. 1-39.

Xilinx Inc., "Using Embedded Multipliers", Virtex-II Platform FPGA Handbook, UG002 (v1.3), Dec. 3, 2001, pp. 251-257.

Xilinx, Inc., "A 1D Systolic FIR," copyright 1994-2002, downloaded from http://www.iro.umontreal.ca/~aboulham/F6221/Xilinx%20A%201D%20systolic%20FIR.htm.

Xilinx, Inc., "The Future of FPGA's," White Paper, available Nov. 14, 2005 for download from http://www.xilinx.com/prs_rls,5yrwhite.htm.

* cited by examiner

US 8,255,448 B1

IMPLEMENTING DIVISION IN A PROGRAMMABLE INTEGRATED CIRCUIT DEVICE

BACKGROUND OF THE INVENTION

This invention relates to implementing division in programmable integrated circuit devices such as, e.g., programmable logic devices (PLDs).

As applications for which PLDs are used increase in complexity, it has become more common to design PLDs to include specialized processing blocks in addition to blocks of generic programmable logic resources. Such specialized processing blocks may include a concentration of circuitry on a PLD that has been partly or fully hardwired to perform one or more specific tasks, such as a logical or a mathematical operation. A specialized processing block may also contain one or more specialized structures, such as an array of configurable memory elements. Examples of structures that are commonly implemented in such specialized processing blocks include: multipliers, arithmetic logic units (ALUs), barrel-shifters, various memory elements (such as FIFO/LIFO/SIPO/RAM/ROM/CAM blocks and register files), AND/NAND/OR/NOR arrays, etc., or combinations thereof.

One particularly useful type of specialized processing block that has been provided on PLDs is a digital signal processing (DSP) block, which may be used to process, e.g., audio signals. Such blocks are frequently also referred to as multiply-accumulate ("MAC") blocks, because they include structures to perform multiplication operations, and sums and/or accumulations of multiplication operations.

For example, PLDs sold by Altera Corporation, of San Jose, Calif., as part of the STRATIX® family, include DSP blocks, each of which may include four 18-by-18 multipliers. Each of those DSP blocks also may include adders and registers, as well as programmable connectors (e.g., multiplexers) that allow the various components to be configured in different ways. In each such block, the multipliers can be configured not only as four individual 18-by-18 multipliers, but also as four smaller multipliers, or as one larger (36-by-36) multiplier. In addition, one 18-by-18 complex multiplication (which decomposes into two 18-by-18 multiplication operations for each of the real and imaginary parts) can be performed.

Larger multiplications can be performed by using more of the 18-by-18 multipliers—e.g., from other DSP blocks. For example, a 54-by-54 multiplier can be decomposed, by linear decomposition, into a 36-by-36 multiplier (which uses the four 18-by-18 multipliers of one DSP block), two 36-by-18 multipliers (each of which uses two 18-by-18 multipliers, for a total of four additional 18-by-18 multipliers, consuming another DSP block), and one 18-by-18 multiplier, consuming a portion of a third DSP block. Thus, using 18-by-18 multipliers, nine multipliers are required to perform a 54-by-54 multiplication.

One type of mathematical function that heretofore has not been easily implemented in a PLD or other programmable device is division. Division, especially double-precision floating point division, which may be required for High Performance Computing, is expensive and slow on current FPGAs. A common implementation in general-purpose programmable logic of an FPGA uses a network of 64 80-bit adders, typically requiring between 6,000 and 9,000 four-input look-up tables. Moreover, the resulting operation is slow, typically having a 150 MHz system speed and about 57 clock cycles of latency.

SUMMARY OF THE INVENTION

The present invention implements multiplier-based division in a programmable device. For example, convergence-type multiplier-based approaches offer the possibility of higher system speeds (on the order of about 300 MHz), lower latency (on the order of 10-20 clock cycles), and lower logic utilization (as most of the calculations are done in multipliers rather than in general-purpose programmable logic).

As described above, the DSP blocks provided on PLDs from Altera Corporation support, inter alia, a 36-bit-by-36-bit multiplier mode. In accordance with the present invention, such a DSP block may be modified to support also a 72-bit-by-18-bit multiplier mode. The resulting asymmetric multiplier can then be used to implement a recursive algorithm to perform division operations, as described in more detail below.

Therefore, in accordance with the present invention, there is provided a method of configuring a programmable integrated circuit device to use multipliers to perform a division operation that provides a quotient of a dividend input value and a divisor input value, where the quotient has a first precision. The method includes configuring logic of the programmable integrated circuit device to use at least a first of the multipliers to operate on said divisor input value to provide an inverted divisor approximation having a second precision less precise than the first precision; configuring logic of the programmable integrated circuit device to recursively compute a remainder by initializing the remainder to said dividend input value at the first precision and then, in each recursive stage, subtracting from the remainder a product of (a) the remainder represented at the second precision, (b) the divisor input value represented at the first precision, and (c) the inverted divisor approximation. Logic of the programmable integrated circuit device is configured to compute a respective component of the quotient in each of the recursive stages, by computing a product of (1) the remainder represented at the second precision, and (2) the inverted divisor approximation. Logic of the programmable integrated circuit device is further configured to add the respective components of the quotient to provide the quotient.

A programmable logic device so configurable or configured, and a machine-readable data storage medium encoded with software for performing the method, are also provided.

BRIEF DESCRIPTION OF THE DRAWINGS

Further features of the invention, its nature and various advantages, will be apparent upon consideration of the following detailed description, taken in conjunction with the accompanying drawings, in which like reference characters refer to like parts throughout, and in which.

DETAILED DESCRIPTION OF THE INVENTION

The following division problem:

$$Q = \frac{X}{Y}$$

can be broken down into the following recursive problem:

$$Q_{i+1} = Q_i + Rh_i \frac{1}{Yh}$$

$$R_{i+1} = R_i - Rh_i \frac{1}{Yh} Y$$

where:

$Q_i$=the partial quotient in the ith iteration, initialized to 0 in the 0th iteration, $R_i$=the partial remainder in the ith iteration, initialized to X in the 0th iteration, $Rh_i$=some number, h, of significant bits of $R_i$, and $Yh$=some number, h, of significant bits of the divisor Y.

As can be seen, in the first (0th) iteration, the partial quotient becomes the product of h bits of X and the inverse of h bits of Y, which will be close as a zeroth-order approximation of the result. At the same time, the remainder becomes the difference between (a) X and (b) the product of (i) h bits of X and (ii) the product of (1) Y and (2) the inverse of h bits of Y, which is the difference between (a) X and (b) the product of (i) h bits of X and (ii) a number close to 1, which is the difference between (a) X and (b) a number close to h bits of X, which is close to zero. In other words, as expected, in the 0th iteration, the result is that $Q_0$ is the product of h bits of X and the inverse of h bits of Y which is close to the result, and $R_0$ is close to zero. The result will converge in subsequent iterations, getting closer to the actual result where $Q_i$ is essentially equal to the result and $R_i$ is essentially equal to zero.

The number of iterations required for convergence depends on how close to the actual result one wants to be, and on the value chosen for h. The value chosen for h cannot be so large that the inverse of Yh cannot be computed easily. In the 72-bit-by-18-bit embodiment described herein, an 18-bit inverse can be calculated relatively easily using, e.g., a Taylor series expansion. The Taylor series expansion can be performed using one 18-bit-by-18-bit multiplier, along with two lookup tables (which may be provided as read-only memories, or programmed into programmable logic in the case of a programmable device), as well as some additional logic such as adders.

In such an embodiment, the $R_i$ partial remainder multiplications can then be 18-bits by the internal precision of the calculation, which may be 64 bits for double-precision arithmetic or 72 bits for extended double-precision arithmetic, which exceed the required mantissa sizes—52 bits and 64 bits respectively—in both cases, so that any errors accumulate to be less than the least-significant-bit position required in the final answer. The $Q_i$ partial quotient multiplications—Rh(1/Yh)—would be 18-bits-by-18-bits in either case. The result can be deemed to have converged when $R_i$ falls below a predetermined value. In a programmable device, that predetermined value may be user-programmable.

Figure 1:
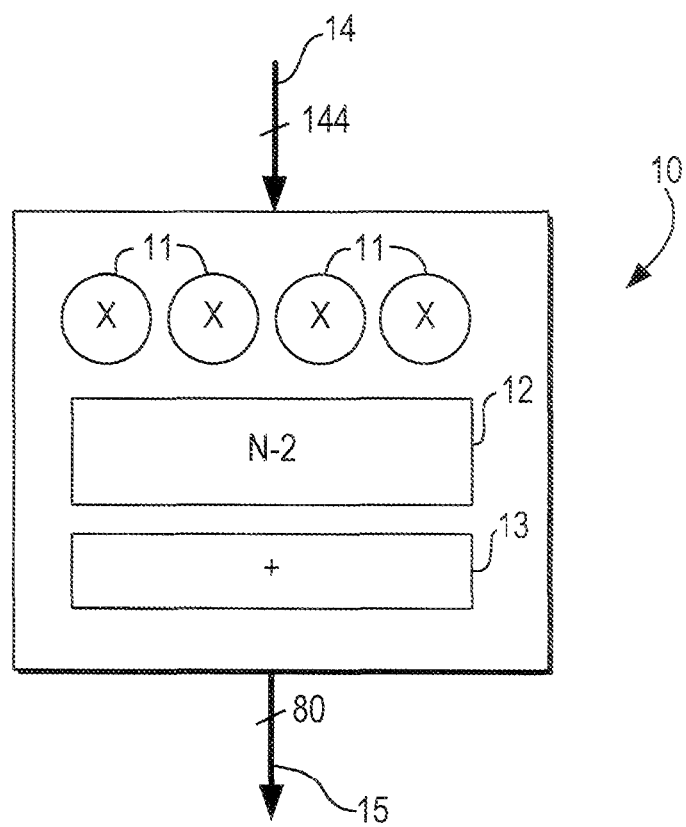
FIG. 1 is a schematic representation of a previously-known specialized processing block in a programmable integrated circuit device.

FIG. 1 schematically shows a previously-known DSP block 10 of the type described above, available in devices from Altera Corporation. DSP block 10 may have four 18-bit-by-18-bit multipliers 11, whose outputs may be combined by N:2 compressor 12 to provide two partial sums and a carry vector, which are further combined in carry-lookahead adder 13. The total number of signals typically include 144 input data signals 14, and 72-80 output data signals 15.

Figure 2:
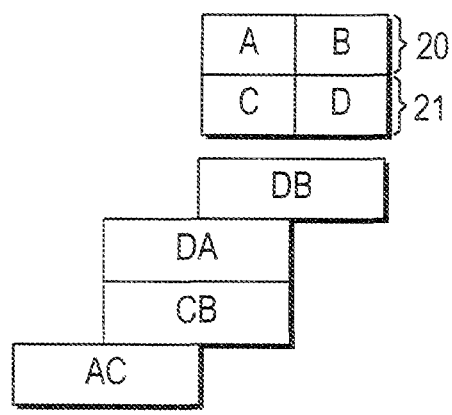
FIG. 2 is a diagram showing the decomposition of a 36-bit-by-36-bit multiplication to be performed in a specialized processing block such as that of FIG. 1.

FIG. 2 shows how such a structure may be used to perform a 36-bit-by-36-bit multiplication. The two 36-bit numbers 20, 21 are decomposed into two 18-bit numbers each—A|B and C|D. The four multipliers form four 18-bit-by-18-bit products DB, DA, CB and AC. The products DA and CB are left-shifted by 18 bits, and the product AC is left-shifted by 36 bits.

Figure 3:
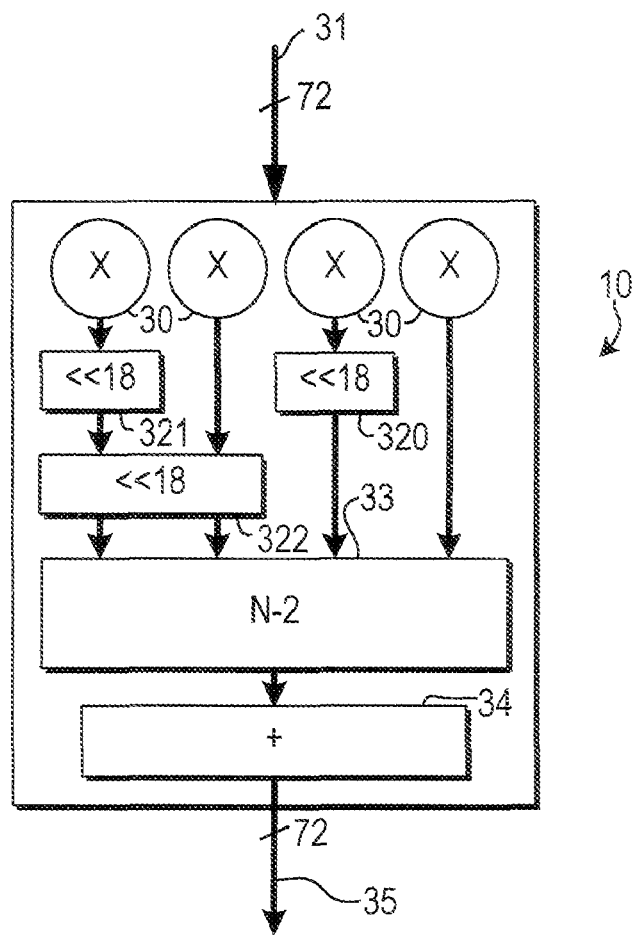
FIG. 3 is a diagram of the logic flow, and a circuit configuration with which a specialized processing block such as that of FIG. 1 may be programmed, for performing the multiplication of FIG. 2.

FIG. 3 shows the connections in block 10 for performing those multiplications. There are four 18-bit-by-18-bit multipliers 30. As each has 36 (i.e., 18+18) inputs, 36×4=144 inputs 31 are available. However, only 72 unique inputs are required. The 72 inputs can be provided only once, with each input to be used more than once being de-multiplexed to the respective multipliers 30 inside DSP block 10, or inputs can be provided multiple times, once each for every component to use the input, so that up to all 144 inputs are used. The partial products may be left-shifted at 320, 321, 322 using, e.g., a combination of multiplexers and wires (conductive traces). After all partial products have thus been properly aligned, they are compressed using the N:2 compressor 33 into a partial product vector and a carry vector, after which they are added in carry-lookahead adder 34 to make the 72-bit output 35.

Figure 4:
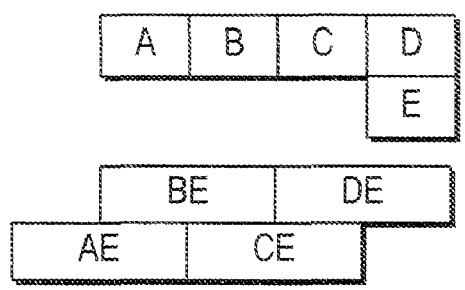
FIG. 4 is a diagram showing the decomposition of a 72-bit-by-18-bit multiplication to be performed in a specialized processing block in accordance with an embodiment of the present invention, for implementing division.
Figure 5:
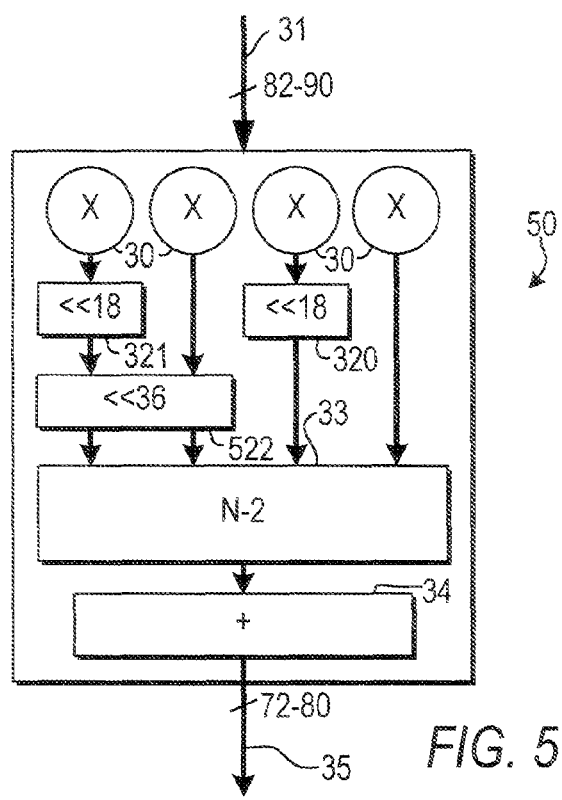
FIG. 5 is a diagram of the logic flow, and a circuit configuration with which a specialized processing block may be programmed, for performing the multiplication of FIG. 4 to implement division in accordance with an embodiment of the present invention.

A 72-bit-by-18-bit multiplication can use the same number of partial products as a 36-bit-by-36-bit multiplication, except that there are five unique 18-bit numbers. FIG. 4 shows the offsets and combining patterns for the partial products of an 72-bit-by-18-bit multiplication, while FIG. 5 shows how block 10 of FIG. 3 may be modified to provide block 50 capable of performing a 72-bit-by-18-bit multiplication.

As can be seen in block 50, 18-bit left-shifter 322 is replaced with 36-bit left-shifter 522. Preferably, left-shifter 522 is selectable (e.g., using a multiplexer) to shift by either 18 or 36 bits, so that the user can use block 50 in the manner of block 10 if desired.

Of the 144 input conductors 31, between 82 (in the case of a 64-bit-by-18-bit calculation for double-precision arithmetic) and 90 (in the case of a 72-bit-by-18-bit calculation for extended double-precision arithmetic) are used for inputs, while correspondingly 72 or 80 bits are used as outputs. The 72-bit-by-18-bit multiplication operation actually produces a 90-bit output, which cannot be handled by the routing structure in this embodiment, but as the input of each iteration can handle 72 bits, and as the overall division operation is only an iterative approximation, only the 72 most significant bits need be routed out. The precision lost by discarding the 18 least significant bits will not have much impact. Optionally, adder 34 can include a rounding mode to compensate for the discarding of the least significant bits. For example, rounding can occur at the 52nd bit for double precision calculations or at the 64th bit for extended double precision calculations.

In the calculation above for the partial remainder $R_{i+1}$, multiplicative term $Rh_i$ is a subset or truncation of the additive term $R_i$. Therefore, those h bits (e.g., 18 bits) need not be input twice, but rather simply routed twice within block 50. With 144 inputs, the partial remainder recurrence equation can be supported by the block 50. It is already known to provide additional input terms for compressor 33, which may be used, e.g., for accumulation, chaining or redundancy. In order to include the h bits of $Rh_i$ in the multiplication operation, all that would be needed is some additional multiplexing.

Figure 6:
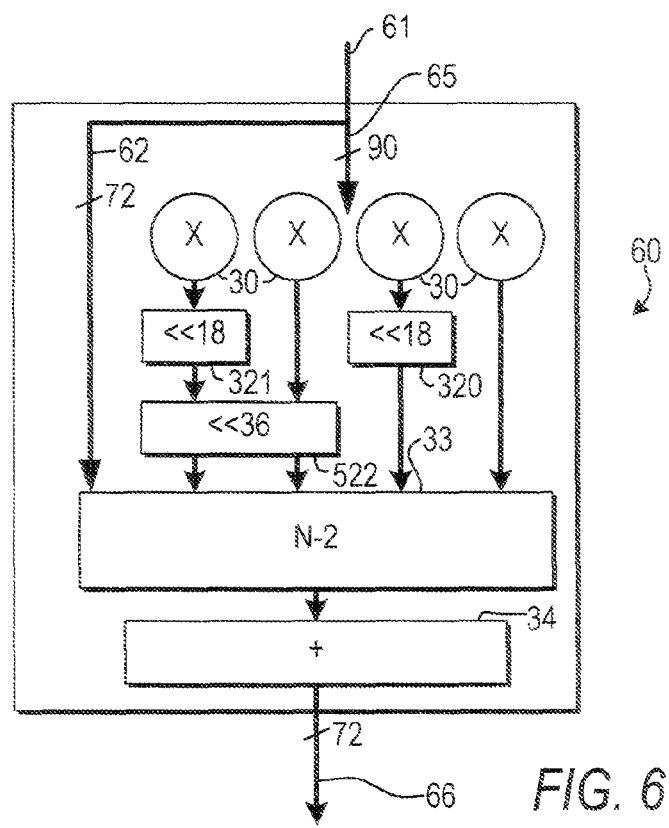
FIG. 6 is a diagram of the logic flow, and a circuit configuration with which a specialized processing block may be programmed, for implementing division in accordance with an embodiment of the present invention.
Figure 7:
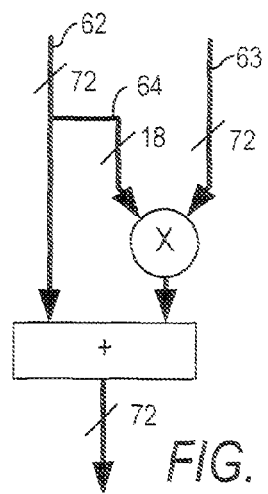
FIG. 7 is a diagram of a logical equivalent of the configuration of FIG. 6.

As a reminder, each term of the partial remainder recurrence subtracts (which is a form of addition) a product of $Rh_i$ (which is 18 bits wide) and Y(1/Yh) which itself is a 72-bit product. The structure of a DSP block 60 for performing this calculation is shown in FIG. 6. The logical equivalent is shown in FIG. 7. There are 144 inputs 61 representing 72 bits 62 of $R_i$ and 72 bits 63 of Y(1/Yh). The latter are combined with the 18 bits 64 of $Rh_i$ which are a subset of bits 62 to provide 90 bits 65. As discussed above, output 66 may be 90 bits wide, but is truncated to its 72 most significant bits, or optionally rounded to 52 or 64 bits, for use by the next iteration.

Chaining a number of these blocks allows calculation of a division operation. With an 18-bit "guess" for 1/Yh, each iteration should give about 15 "good" bits—i.e., bits that can be counted on to be correct. As discussed above, any errors can be expected to accumulate at bit positions less significant than the fifteenth bit of each iteration. Therefore, for double precision, which requires 52 bits, four iterations (60 "good" bits) should be sufficient, while for extended double precision, which requires 64 bits, five iterations (75 "good" bits) should be sufficient.

As shown below in FIG. 8, each iteration requires five 18-bit-by-18-bit multipliers—the four multipliers of a DSP block for the remainder calculation, and one additional multiplier for the quotient calculation (which, as a reminder, is simply $Rh_i$(1/Yh) added to the previous quotient), or five multipliers. Therefore, the four iterations of a double-precision division operation will require twenty multipliers, plus five more to prepare the "constants" 1/Yh (which requires one 18-bit-by-18-bit multiplier as discussed above) and Y(1/Yh) (which requires four 18-bit-by-18-bit multipliers to perform the necessary 72-bit-by-18-bit multiplication), for a total of twenty-five multipliers. By comparison, for example, a double-precision multiplication operation requires eight or nine 18-bit-by-18-bit multipliers. While division according to the present invention thus requires more multipliers than multiplication, it nevertheless requires fewer resources than the 64 adders previously used, as discussed above.

Figure 8:
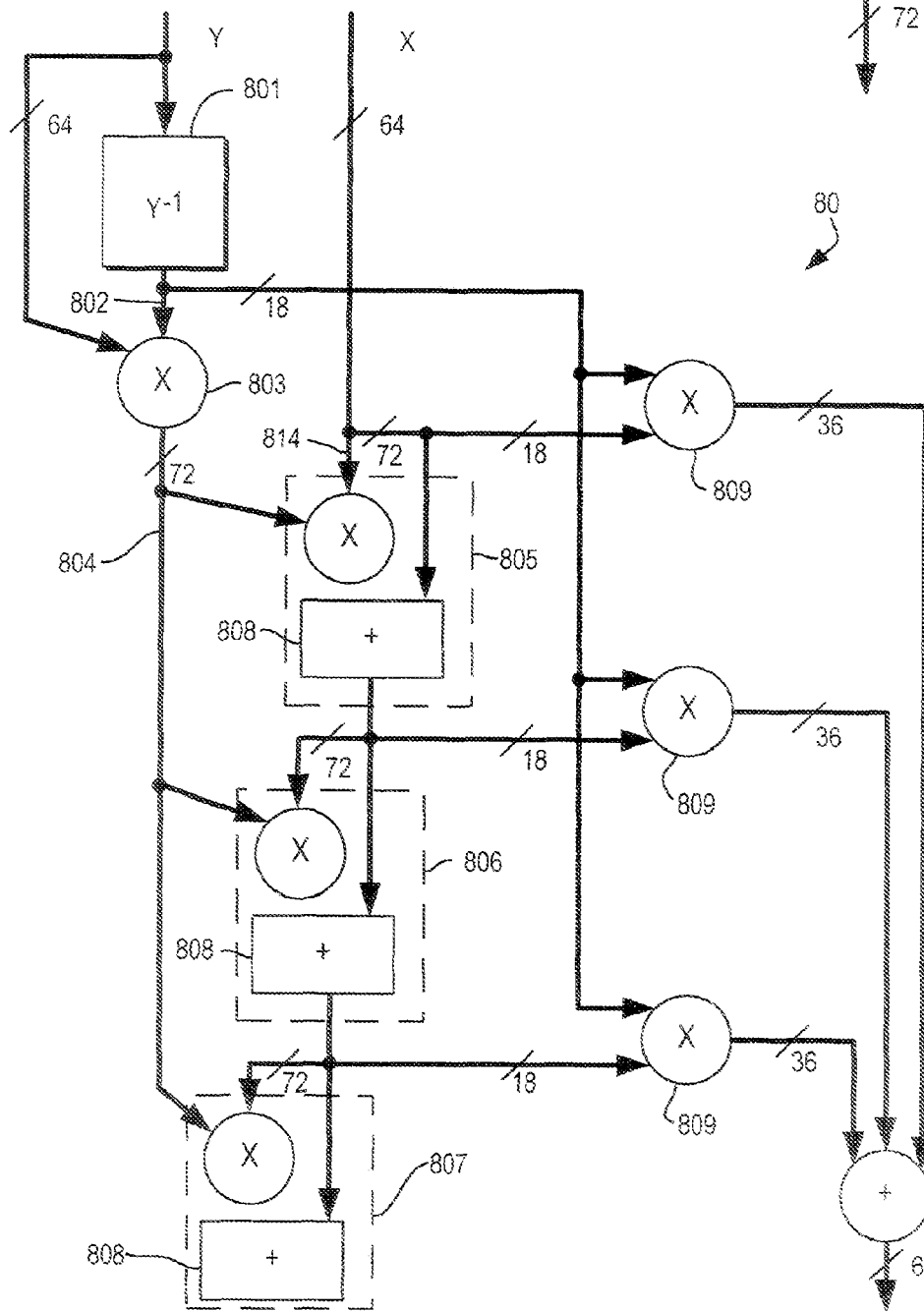
FIG. 8 is a schematic representation of a divider structure in accordance with an embodiment of the present invention.

An embodiment of a divider structure 80 in accordance with the invention is shown in FIG. 8. Although, as discussed above, a minimum of four iterations ordinarily would be provided, to simplify the drawing only three iterations are included in divider structure 80. Y, the divisor, is input at 81, while X, the dividend, is input at 82.

A first DSP block 801 is used to provide an 18-bit approximation 1/Yh of the inverse of Y, using one 18-bit-by-18-bit multiplier plus additional logic as described above. This value 802 is multiplied by Y in DSP block 803 (configured as a 72-bit-by-18-bit multiplier to perform 64-bit-by-18-bit multiplication in a double-precision embodiment or 72-bit-by-18-bit multiplication in an extended double-precision embodiment) and the result 804, which approximates, but does not quite equal, one, is provided to each of DSP blocks 805, 806, 807 which perform respective stages of the remainder calculation. At each stage, 72 bits of the previous remainder 814 are multiplied by value 804, and that product is subtracted from the same previous remainder 814 by carry-lookahead adder 808. The subtraction can be facilitated either by negating inputs to some of the 18-bit multipliers or it can be done in compressor 11 (not shown in FIG. 8).

For each stage of the quotient, value 802 (1/Yh) is multiplied at respective multiplier 809 by previous remainder 814 as input to that stage. All of these stages are then added together. The addition is represented symbolically at 819. However, while one big adder 819 could be provided, the addition alternatively could be carried out in steps, using, e.g., a chaining mode available in DSP blocks of the Altera Corporation products described above. In addition, because each stage provides about fifteen "good" bits of the final quotient, the result of each subsequent stage (except the first) preferably is right-shifted by about fifteen additional bits. Insofar as shifters are essentially simply wires, the shifters are not explicitly shown in FIG. 8. However, the shifting occurs after each multiplier 809 and before adder 819.

Thus, the method of the invention configures a programmable integrated circuit device, such as a PLD, to create the structures shown in FIGS. 6 and 8 to perform division operations using multipliers on the device, at a savings as compared to using adders as has been done previously.

Instructions for carrying out the method according to this invention may be encoded on a machine-readable medium, to be executed by a suitable computer or similar device to implement the method of the invention for programming or configuring programmable integrated circuit devices to perform operations as described above. For example, a personal computer may be equipped with an interface to which a programmable integrated circuit device can be connected, and the personal computer can be used by a user to program the programmable integrated circuit device using a suitable software tool, such as the QUARTUS® II software available from Altera Corporation, of San Jose, Calif.

Figure 9:
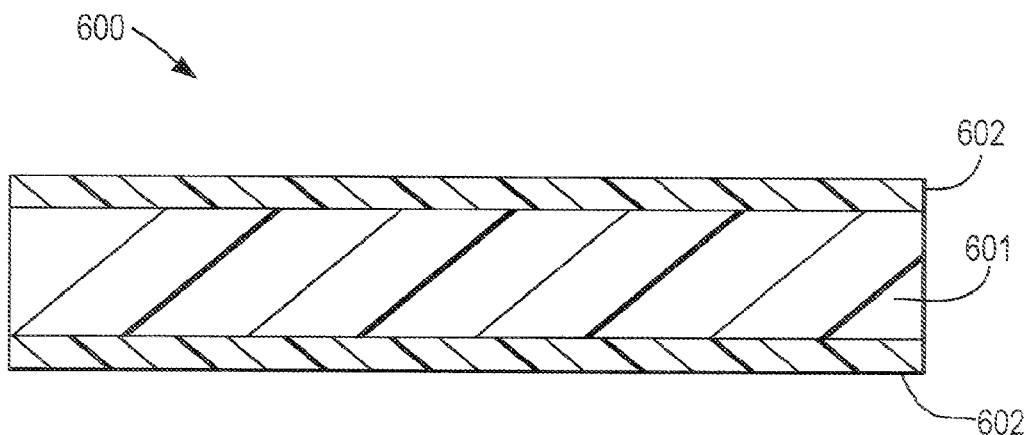
FIG. 9 is a cross-sectional view of a magnetic data storage medium encoded with a set of machine executable instructions for performing the method according to the present invention.

FIG. 9 presents a cross section of a magnetic data storage medium 600 which can be encoded with a machine executable program that can be carried out by systems such as the aforementioned personal computer, or other computer or similar device. Medium 600 can be a floppy diskette or hard disk, or magnetic tape, having a suitable substrate 601, which may be conventional, and a suitable coating 602, which may be conventional, on one or both sides, containing magnetic domains (not visible) whose polarity or orientation can be altered magnetically. Except in the case where it is magnetic tape, medium 600 may also have an opening (not shown) for receiving the spindle of a disk drive or other data storage device.

The magnetic domains of coating 602 of medium 600 are polarized or oriented so as to encode, in manner which may be conventional, a machine-executable program, for execution by a programming system such as a personal computer or other computer or similar system, having a socket or peripheral attachment into which the PLD to be programmed may be inserted, to configure appropriate portions of the PLD, including its specialized processing blocks, if any, in accordance with the invention.

Figure 10:
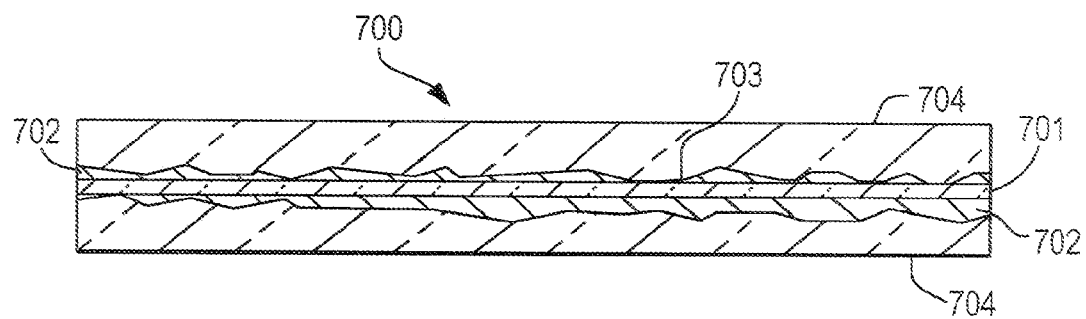
FIG. 10 is a cross-sectional view of an optically readable data storage medium encoded with a set of machine executable instructions for performing the method according to the present invention.

FIG. 10 shows a cross section of an optically-readable data storage medium 700 which also can be encoded with such a machine-executable program, which can be carried out by systems such as the aforementioned personal computer, or other computer or similar device. Medium 700 can be a conventional compact disk read only memory (CD-ROM) or digital video disk read only memory (DVD-ROM) or a rewriteable medium such as a CD-R, CD-RW, DVD-R, DVD-RW, DVD+R, DVD+RW, or DVD-RAM or a magneto-optical disk which is optically readable and magneto-optically rewriteable. Medium 700 preferably has a suitable substrate 701, which may be conventional, and a suitable coating 702, which may be conventional, usually on one or both sides of substrate 701.

In the case of a CD-based or DVD-based medium, as is well known, coating 702 is reflective and is impressed with a plurality of pits 703, arranged on one or more layers, to encode the machine-executable program. The arrangement of pits is read by reflecting laser light off the surface of coating 702. A protective coating 704, which preferably is substantially transparent, is provided on top of coating 702.

In the case of magneto-optical disk, as is well known, coating 702 has no pits 703, but has a plurality of magnetic domains whose polarity or orientation can be changed magnetically when heated above a certain temperature, as by a laser (not shown). The orientation of the domains can be read by measuring the polarization of laser light reflected from coating 702. The arrangement of the domains encodes the program as described above.

Thus it is seen that a method for efficiently carrying out division in a programmable integrated circuit device, a programmable integrated circuit device programmed to perform the method, and software for carrying out the programming, have been provided.

Figure 11:
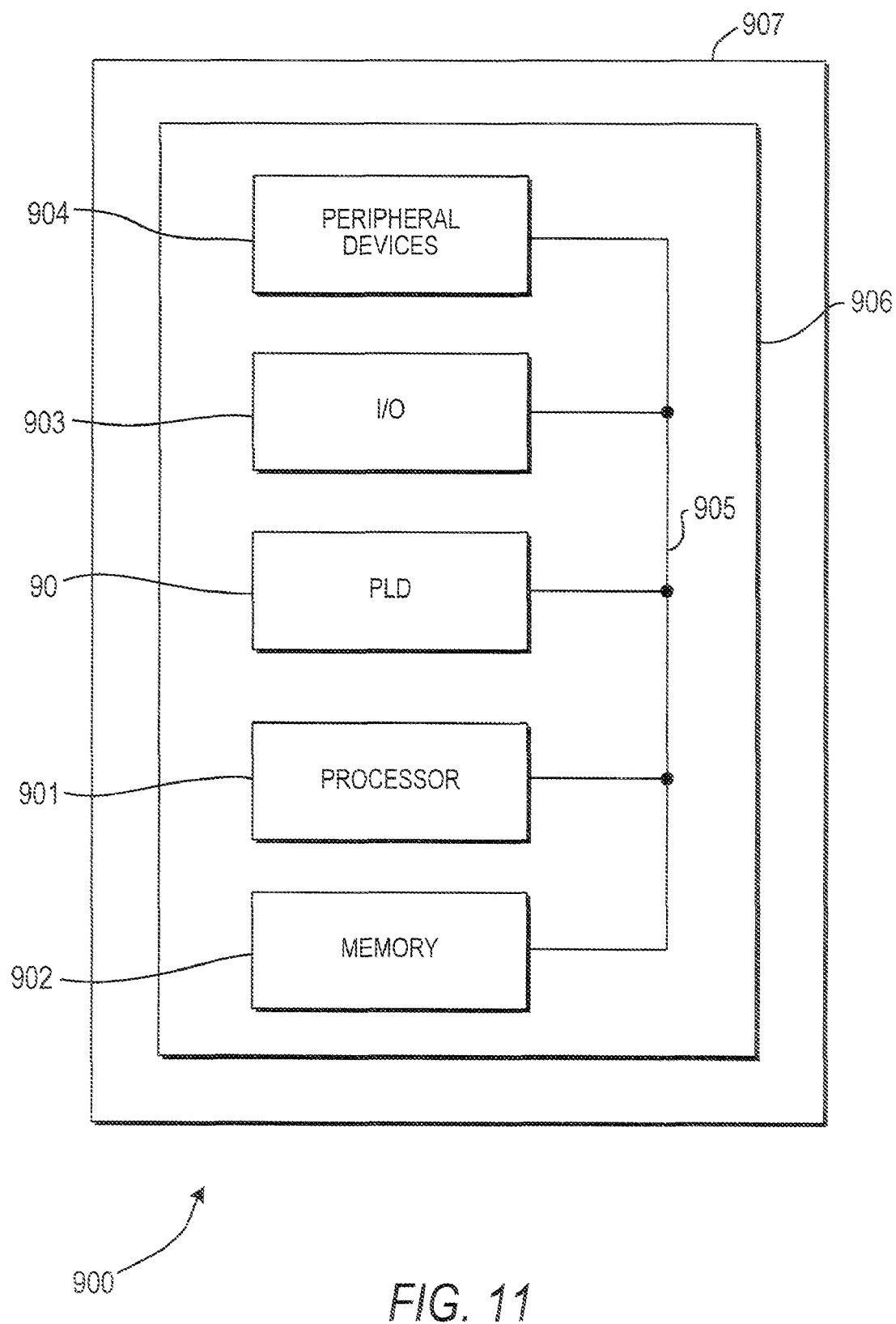
FIG. 11 is a simplified block diagram of an illustrative system employing a programmable logic device incorporating the present invention.

A PLD 90 programmed according to the present invention may be used in many kinds of electronic devices. One possible use is in a data processing system 900 shown in FIG. 11. Data processing system 900 may include one or more of the following components: a processor 901; memory 902; I/O circuitry 903; and peripheral devices 904. These components are coupled together by a system bus 905 and are populated on a circuit board 906 which is contained in an end-user system 907.

System 900 can be used in a wide variety of applications, such as computer networking, data networking, instrumentation, video processing, digital signal processing, or any other application where the advantage of using programmable or reprogrammable logic is desirable. PLD 90 can be used to perform a variety of different logic functions. For example, PLD 90 can be configured as a processor or controller that works in cooperation with processor 901. PLD 90 may also be used as an arbiter for arbitrating access to a shared resources in system 900. In yet another example, PLD 90 can be configured as an interface between processor 901 and one of the other components in system 900. It should be noted that system 900 is only exemplary, and that the true scope and spirit of the invention should be indicated by the following claims.

Various technologies can be used to implement PLDs 90 as described above and incorporating this invention.

It will be understood that the foregoing is only illustrative of the principles of the invention, and that various modifications can be made by those skilled in the art without departing from the scope and spirit of the invention. For example, the various elements of this invention can be provided on a programmable integrated circuit device in any desired number and/or arrangement. One skilled in the art will appreciate that the present invention can be practiced by other than the described embodiments, which are presented for purposes of illustration and not of limitation, and the present invention is limited only by the claims that follow.

What is claimed is:

1. A method of configuring a programmable integrated circuit device to use dedicated symmetrical multipliers to perform a division operation that provides a quotient of a dividend input value and a divisor input value, said quotient having a first precision, said method comprising:

configuring logic of said programmable integrated circuit device to use at least a first of said dedicated symmetrical multipliers to operate on said divisor input value to provide an inverted divisor approximation having a second precision less precise than said first precision;

configuring logic of said programmable integrated circuit device to recursively compute a remainder by initializing said remainder to said dividend input value at said first precision and then, in each recursive stage, subtracting from said remainder a product, computed by a plurality of said dedicated symmetrical multipliers configured as an asymmetrical multiplier, of (a) said remainder represented at said second precision, (b) said divisor input value represented at said first precision, and (c) said inverted divisor approximation;

configuring logic of said programmable integrated circuit device to compute a respective component of said quotient in each said recursive stage, by computing, using at least one of said dedicated symmetrical multipliers, a product of (1) said remainder represented at said second precision, and (2) said inverted divisor approximation; and configuring logic of said programmable integrated circuit device to add said respective components of said quotient to provide said quotient.

2. The method of claim 1 wherein said configuring logic of said programmable integrated circuit device to recursively compute a remainder comprises configuring said logic to shorten said remainder as computed in each said recursive stage to at most a number of bits representing said first precision.

3. The method of claim 2 wherein said configuring said logic to shorten said remainder to at most said first number of bits comprises configuring said logic to truncate said remainder to said number of bits representing said first precision.

4. The method of claim 2 wherein said configuring said logic to shorten said remainder to at most said number of bits representing said first precision comprises configuring said logic to round said remainder to a number of bits determined by a desired level of precision.

5. The method of claim 1 wherein:
there are four said recursive stages; and
said dividend input value, said divisor input value and said quotient are double-precision values.

6. The method of claim 1 wherein:
there are five said recursive stages; and
said dividend input value, said divisor input value and said quotient are extended double-precision values.

7. The method of claim 1 wherein said configuring logic of said programmable integrated circuit device to add said respective components of said quotient comprises configuring logic of said programmable integrated circuit device as a single adder for adding said components of said quotient from all said stages.

8. The method of claim 7 further comprising configuring logic of said programmable integrated circuit device to shift each component of said quotient from each successive one of said stages by a successive multiple of a predetermined number of bits.

9. The method of claim 8 wherein said predetermined number of bits is less than a number of bits representing said second precision.

10. The method of claim 1 wherein:
said configuring logic of said programmable integrated circuit device to add said respective components of said quotient comprises configuring each said stage to add its respective component of said quotient to a sum of components of said quotient from a preceding stage; and
in a first one of said plurality of stages, said sum of components of said quotient from a preceding stage is considered to be zero.

11. The method of claim 10 further comprising configuring each said stage after said first one of said plurality of stages to shift its respective component of said quotient by a successive multiple of a predetermined number of bits.

12. The method of claim 11 wherein said predetermined number of bits is less than a number of bits representing said second precision.

13. A programmable integrated circuit device configurable to perform a division operation that provides a quotient of a dividend input value and a divisor input value, each of which has a first precision, said programmable integrated circuit device comprising:
a plurality of specialized processing blocks each having a plurality of dedicated symmetrical multiplier circuits;
logic configurable to use at least a first of said dedicated symmetrical multiplier circuits to operate on said divisor input value to provide an inverted divisor approximation having a second precision less precise than said first precision;
logic configurable to recursively compute a remainder by initializing said remainder to said dividend input value at said first precision and then, in each recursive stage, subtracting from said remainder a product, computed using a plurality of said dedicated symmetrical multiplier circuits configured as an asymmetrical multiplier circuit, of (a) said remainder represented at said second precision, (b) said divisor input value represented at said first precision, and (c) said inverted divisor approximation;
logic configurable to compute a respective component of said quotient in each said recursive stage, by computing, using at least one of said dedicated symmetrical multiplier circuits, a product of (1) said remainder represented at said second precision, and (2) said inverted divisor approximation; and
logic configurable to add said respective components of said quotient to provide said quotient.

14. The programmable integrated circuit device of claim 13 wherein said logic configurable to recursively compute a remainder comprises configuring said logic to shorten said remainder as computed in each said recursive stage to at most a number of bits representing said first precision.

15. The programmable integrated circuit device of claim 14 wherein said logic configurable to shorten said remainder to at most said first number of bits comprises configuring said logic to truncate said remainder to said number of bits representing said first precision.

16. The programmable integrated circuit device of claim 14 wherein said logic configurable to shorten said remainder to at most said number of bits representing said first precision comprises configuring said logic to round said remainder to a number of bits determined by a desired level of precision.

17. The programmable integrated circuit device of claim 13 wherein:
there are four said recursive stages; and
said dividend input value, said divisor input value and said quotient are double-precision values.

18. The programmable integrated circuit device of claim 13 wherein:
there are five said recursive stages; and
said dividend input value, said divisor input value and said quotient are extended double-precision values.

19. The programmable integrated circuit device of claim 13 wherein said logic configurable to add said respective components of said quotient comprises logic configurable as a single adder for adding said components of said quotient from all said stages.

20. The programmable integrated circuit device of claim 19 further comprising logic configurable to shift each component of said quotient from each successive one of said stages by a successive multiple of a predetermined number of bits.

21. The programmable integrated circuit device of claim 20 wherein said predetermined number of bits is less than a number of bits representing said second precision.

22. The programmable integrated circuit device of claim 13 wherein:
said logic configurable to add said respective components of said quotient comprises logic in each said stage configurable to add its respective component of said quotient to a sum of components of said quotient from a preceding stage; and
in a first one of said plurality of stages, said sum of components of said quotient from a preceding stage is considered to be zero.

23. The programmable integrated circuit device of claim 22 further comprising logic in each said stage after said first one of said plurality of stages configurable to shift its respective component of said quotient by a successive multiple of a predetermined number of bits.

24. The programmable integrated circuit device of claim 23 wherein said predetermined number of bits is less than a number of bits representing said second precision.

25. The programmable integrated circuit device of claim 13 wherein said programmable integrated circuit device is a programmable logic device.

26. A programmable integrated circuit device configured to perform a division operation that provides a quotient of a dividend input value and a divisor input value, each of which has a first precision, said programmable integrated circuit device comprising:
a plurality of specialized processing blocks each having a plurality of dedicated symmetrical multiplier circuits;
logic configured to use at least a first of said dedicated symmetrical multiplier circuits to operate on said divisor input value to provide an inverted divisor approximation having a second precision less precise than said first precision;
logic configured to recursively compute a remainder by initializing said remainder to said dividend input value at said first precision and then, in each recursive stage, subtracting from said remainder a product, computed using a plurality of said dedicated symmetrical multiplier circuits configured as an asymmetrical multiplier circuit, of (a) said remainder represented at said second precision, (b) said divisor input value represented at said first precision, and (c) said inverted divisor approximation;

logic configured to compute a respective component of said quotient in each said recursive stage, by computing, using at least one of said dedicated symmetrical multiplier circuits, a product of (1) said remainder represented at said second precision, and (2) said inverted divisor approximation; and logic configured to add said respective components of said quotient to provide said quotient.

27. The configured programmable integrated circuit device of claim 26 wherein said logic configured to recursively compute a remainder comprises configuring said logic to shorten said remainder as computed in each said recursive stage to at most a number of bits representing said first precision.

28. The configured programmable integrated circuit device of claim 27 wherein said logic configured to shorten said remainder to at most said first number of bits comprises configuring said logic to truncate said remainder to said number of bits representing said first precision.

29. The configured programmable integrated circuit device of claim 27 wherein said logic configured to shorten said remainder to at most said number of bits representing said first precision comprises configuring said logic to round said remainder to a number of bits determined by a desired level of precision.

30. The configured programmable integrated circuit device of claim 26 wherein:
there are four said recursive stages; and
said dividend input value, said divisor input value and said quotient are double-precision values.

31. The configured programmable integrated circuit device of claim 26 wherein:
there are five said recursive stages; and
said dividend input value, said divisor input value and said quotient are extended double-precision values.

32. The configured programmable integrated circuit device of claim 26 wherein said logic configured to add said respective components of said quotient comprises logic configured as a single adder for adding said components of said quotient from all said stages.

33. The configured programmable integrated circuit device of claim 32 further comprising logic configured to shift each component of said quotient from each successive one of said stages by a successive multiple of a predetermined number of bits.

34. The configured programmable integrated circuit device of claim 33 wherein said predetermined number of bits is less than a number of bits representing said second precision.

35. The configured programmable integrated circuit device of claim 26 wherein:
said logic configured to add said respective components of said quotient comprises logic in each said stage configurable to add its respective component of said quotient to a sum of components of said quotient from a preceding stage; and
in a first one of said plurality of stages, said sum of components of said quotient from a preceding stage is considered to be zero.

36. The configured programmable integrated circuit device of claim 35 further comprising logic in each said stage after said first one of said plurality of stages configurable to shift its respective component of said quotient by a successive multiple of a predetermined number of bits.

37. The configured programmable integrated circuit device of claim 36 wherein said predetermined number of bits is less than a number of bits representing said second precision.

38. The configured programmable integrated circuit device of claim 26 wherein said programmable integrated circuit device is a programmable logic device.

39. A machine-readable data storage medium encoded with machine-executable instructions for configuring a programmable integrated circuit device to use dedicated symmetrical multipliers to perform a division operation that provides a quotient of a dividend input value and a divisor input value, said quotient having a first precision, said instructions comprising:
instructions to configure logic of said programmable integrated circuit device to use at least a first of said dedicated symmetrical multipliers to operate on said divisor input value to provide an inverted divisor approximation having a second precision less precise than said first precision;
instructions to configure logic of said programmable integrated circuit device to recursively compute a remainder by initializing said remainder to said dividend input value at said first precision and then, in each recursive stage, subtracting from said remainder a product, computed using a plurality of said dedicated symmetrical multipliers configured as an asymmetrical multiplier, of (a) said remainder represented at said second precision, (b) said divisor input value represented at said first precision, and (c) said inverted divisor approximation;
instructions to configure logic of said programmable integrated circuit device to compute a respective component of said quotient in each said recursive stage, by computing, using at least one of said dedicated symmetrical multipliers, a product of (1) said remainder represented at said second precision, and (2) said inverted divisor approximation; and
instructions to configure logic of said programmable integrated circuit device to add said respective components of said quotient to provide said quotient.

40. The machine-readable data storage medium of claim 39 wherein said instructions to configure logic of said programmable integrated circuit device to recursively compute a remainder comprises instructions to configure said logic to shorten said remainder as computed in each said recursive stage to at most a number of bits representing said first precision.

41. The machine-readable data storage medium of claim 40 wherein said instructions to configure said logic to shorten said remainder to at most said first number of bits comprises instructions to configure said logic to truncate said remainder to said number of bits representing said first precision.

42. The machine-readable data storage medium of claim 40 wherein said instructions to configure said logic to shorten said remainder to at most said number of bits representing said first precision comprises instructions to configure said logic to round said remainder to a number of bits determined by a desired level of precision.

43. The machine-readable data storage medium of claim 39 wherein:
there are four said recursive stages; and
said dividend input value, said divisor input value and said quotient are double-precision values.

44. The machine-readable data storage medium of claim 39 wherein:
there are five said recursive stages; and
said dividend input value, said divisor input value and said quotient are extended double-precision values.

45. The machine-readable data storage medium of claim 39 wherein said instructions to configure logic of said programmable integrated circuit device to add said respective components of said quotient comprises instructions to configure logic of said programmable integrated circuit device as a single adder for adding said components of said quotient from all said stages.

46. The machine-readable data storage medium of claim 45 further comprising instructions to configure logic of said programmable integrated circuit device to shift each component of said quotient from each successive one of said stages by a successive multiple of a predetermined number of bits.

47. The machine-readable data storage medium of claim 46 wherein said predetermined number of bits is less than a number of bits representing said second precision.

48. The machine-readable data storage medium of claim 39 wherein:
   said instructions to configure logic of said programmable integrated circuit device to add said respective components of said quotient comprises instructions to configure each said stage to add its respective component of said quotient to a sum of components of said quotient from a preceding stage; and
   in a first one of said plurality of stages, said sum of components of said quotient from a preceding stage is considered to be zero.

49. The machine-readable data storage medium of claim 48 further comprising instructions to configure each said stage after said first one of said plurality of stages to shift its respective component of said quotient by a successive multiple of a predetermined number of bits.

50. The machine-readable data storage medium of claim 49 wherein said predetermined number of bits is less than a number of bits representing said second precision.

* * * * *